(12) United States Patent
Cheng et al.

(10) Patent No.: US 6,526,088 B1
(45) Date of Patent: Feb. 25, 2003

(54) ALIGNMENT-FREE SOLID LASER APPARATUS

(75) Inventors: Yong Cheng, Apt. 502, Building No. 9 Xiang He Yuan, Hua Yuan Cheng, Nan Hu, Wuchang, Wuhan 430064 P.R. (CN); Huisheng Wang, Wuhan (CN); Zhihuai Wang, Wuhan (CN); Xiaobing Wang, Wuhan (CN); Liangqing Han, Wuhan (CN); Jiangbai Zhang, Wuhan (CN)

(73) Assignees: Yong Cheng, Wuchang (CN); Zhixing Zhang, Wuchang (CN)

( * ) Notice: Subject to any disclaimer, the term of this patent is extended or adjusted under 35 U.S.C. 154(b) by 0 days.

(21) Appl. No.: 09/582,861

(22) PCT Filed: Jan. 4, 1999

(86) PCT No.: PCT/CN99/00001

§ 371 (c)(1),
(2), (4) Date: Jul. 6, 2000

(87) PCT Pub. No.: WO99/35722

PCT Pub. Date: Jul. 15, 1999

(30) Foreign Application Priority Data

Jan. 6, 1998 (CN) .......................................... 98113402

(51) Int. Cl.[7] ................................................. H01S 3/08
(52) U.S. Cl. ......................................... 372/100; 372/99
(58) Field of Search ............................. 372/29.022, 98, 372/99, 100

(56) References Cited

U.S. PATENT DOCUMENTS

| 3,611,436 | A | | 10/1971 | Rigrod et al. | |
|---|---|---|---|---|---|
| 3,829,791 | A | * | 8/1974 | Schwartz | 331/94.5 |
| 3,831,106 | A | * | 8/1974 | Ward | 331/94.5 |
| 3,924,201 | A | | 12/1975 | Crow | |
| 4,136,316 | A | * | 1/1979 | Chicklis et al. | 331/94.5 |
| 4,292,602 | A | * | 9/1981 | Bergqvist | 331/94.5 |
| 4,360,925 | A | * | 11/1982 | Brosnan et al. | 372/95 |
| 4,993,038 | A | * | 2/1991 | Nakano et al. | 372/92 |
| 5,210,768 | A | * | 5/1993 | Seguin | 372/92 |
| 5,432,811 | A | * | 7/1995 | Polushkin et al. | 372/66 |
| 5,796,770 | A | * | 8/1998 | Gregor et al. | 372/75 |

FOREIGN PATENT DOCUMENTS

| EP | 0369281 A2 | 5/1990 |
|---|---|---|
| GB | 1590621 A | 6/1981 |
| GB | 2293266 A | 3/1996 |

OTHER PUBLICATIONS

U.S. Jemna Mechunika a optika No. 12, pp. 383–386 (1968).

* cited by examiner

*Primary Examiner*—Paul Ip
*Assistant Examiner*—Davienne Monbleau
(74) *Attorney, Agent, or Firm*—Richard Schmidt; Venable, Baejter, Howard & Civiletti, LLP

(57) ABSTRACT

The alignment-free solid laser of the invention is characterized in that, an orientation prism having three inner surfaces perpendicular to one another, a bottom of equilateral triangle or circle shape, a corner apex located on the axis of the active material is located in front of one end of the active material and is used as a total reflective mirror of the resonant cavity, the other end of the active material is coated with a transitive-reflective film and is used as an output mirror, such that a laser resonant cavity is formed. This alignment-free solid laser has a simple structure, strong ability of misalignment-resistance, high stability, improved beam quality and reduced damage. Besides, it is easy to be operated and is easy to be standardized and modularized. It can be extensively used in military, industrial processing, medical and scientific research fields.

12 Claims, 2 Drawing Sheets

ALIGNMENT-FREE SOLID LASER APPARATUS

The subject application claims a priority under 35 U.S.C. §119 on Chinese Patent Application No. 98113402.5, filed on Jan. 6, 1998, which is herein incorporated by reference.

FIELD OF THE INVENTION

The present invention relates to a solid laser, especially an alignment-free solid laser suitable for industry, military (national defence), medical and scientific research fields.

BACKGROUND OF THE INVENTION

At present, most widely used solid lasers consist of an active laser material (also called laser rod), a pump system and an optical resonant cavity. After absorbing enough pump energy, the active material achieves population inversion and stimulated radiation is generated as a result. With the help of the optical cavity, the stimulated radiation oscillates and is amplified in the cavity, and an amplified stimulated coherent light beam, which is a laser beam of high intensity, is generated. Most cavities consist of two mirrors parallel to each other and the active material is located on the axis of the cavity. The two plane mirrors are required to be parallel to each other exactly and are perpendicular to the active material axis. When the angle between the two mirrors is larger than 20" there will be no laser emission. Therefore, the laser must be designed to have two sets of special means for its regulation to meet the requirement for the cavity and needs to be regulated with the help of a special equipment, otherwise, the laser is impossible to be operated normally. Thus, the structure and the regulation of the optical resonant cavity of the laser have problems in installation, operation and maintenance. When the optical and cavity mirrors axes of the laser cavity deviate from their original position by an applied shock, hit or self-produced heat during the laser operation, the cavity can be in disalignment, even if it is regulated in alignment already. Once disalignment occurs, the output laser energy can be reduced, the beam quality can become inferior, and therefore the availability of the laser is affected. Even worse, the laser may have no output and become useless. Besides, the inhomogeneity and the heat-induced distortion of the active material make the laser beam inferior and the local excessive power density is likely to cause the damage of the laser material. These problems are unavoidable for the conventional laser cavity, because laser beam must oscillates back and forth along the same path. Therefore, forming an alignment-free resonant cavity (i.e. getting laser output after installation without alignment.) to improve its machinery and heat stability and beam quality is an important problem demanding prompt solution. Prior solid lasers require high alignment accuracy and alignment is difficult in installation, furthermore, disalignment is likely to be occurred in bad conditions and is likely to be damaged under high power, therefore, their availability is reduced.

In order to solve the above problems, a large amount of investigations have been made both at home and abroad. A red sapphire laser cavity consisted of a orientation prism and a plane output mirror was published in US Jemna Mechunika a optika No. 12 P.383-6 in 1968, while in patent U.S. Pat. No. 3,924,201, two right angle prisms (Paul prism) are used as two total reflective mirrors of the resonant cavity, in between the active material, Q-switch and an aside-output polarizer are located. The above two structures have partly solved the laser disalignment problem caused by vibration, temperature variation and so on. However, they only have the ability of avoiding misalignment and obtaining high stability in a special direction, while the installation and alignment are still difficult and they do not have the alignment-free characterisitics. A CN patent CN 87.8.16562 has provided a stably aligned, linearly polarized output laser, in which a corner prism is used as a reflector to form a folded optical resonant cavity. The total reflector and the output mirror of the cavity are formed by a glass plate coated with films of different reflectance in different area. In the cavity an optical alignment compensator is interpolated as an adjustable compensation for the optical path deviation caused by machinery errors of optical elements from optical axis. The optical resonant cavity can remain its alignment and have low misalignment even under a great temperature variation condition. Therefore, the laser can output a stabilized, Q-switched and linearly polarized high power laser beam. Problems of the cavity are that it has low disalignment—resistance and is easy to be deformed under high power condition. Besides, since the corner prism is used only as a reflector, the regulation of the optical alignment compensator is technologically complicated, and it is not an alignment-free cavity. Now, the disalignment problem is usually solved by using a module assembled by adhesion and then solidification. However this module must be calibrated and fixed. Besides, this technology is complicated, and can be used only once, because it is hard to be repaired.

DISCLOSURE OF THE INVENTION

The object of the present invention is to overcome the problem of the conventional lasers that the cavity must be regulated by two sets of special means, and is to provide a simple structure, which can be stably operated after assemblage without alignment. This new structure has strong misalignment—resistance, therefore, can provide a stable output laser beam of small divergence angle under strong vibration and large temperature variation environment.

The scheme of the present invention is as following:

The present invention provides an alignment-free solid laser, comprising an active material, a resonant cavity, a pump lamp, a pump power and a focusing cavity, characterized in that the active material is located in the focusing cavity, an orientation prism located in front of one end of the active material is used as a total reflector, the other end of the active material is coated with a transitive—reflective film and is used as a laser output mirror of the cavity, an applied voltage from the pump power is applied to the two ends of the pump lamp, the pump light is reflected and focused on the active material by the inner surfaces of the focusing cavity, the corner apex of the mentioned orientation prism is located on the axis of the active material to form the resonant cavity, the three total reflective inner surfaces of the corner apex of the orientation prism are perpendicular to one another, the shape of the orientation prism is equivalent to a corner cut from a cube and its bottom is of an equilateral triangle or circle shape;

The active material is an optical crystal which has been used in the conventional laser, such as red sapphire, Nd: glass, Nd: YAG, or the like;

The active material located in the focusing cavity can be one or more rods. When it consists of two rods, one rod with a total reflective film on one end and a transitive film on the other end is used as an oscillation rod, while the other rod with a transitive film on one end and a transitive-reflective film on the other end is used as an amplified rod. The two active material rods are symmetrically located relatively to the axis passed through the orientation prism corner apex to form a series alignment-free solid laser;

When the active material consists of many rods, the active material rod array is symmetrically distributed relatively to the axis passed through the corner apex of the orientation prism. One active material end closed to the orientation prism is coated with a transitive film, while the other end is coated with a transitive-reflective film and is used as an output mirror to form a high power solid laser with numbers of outputs, and without disalignment;

A Q-switch can also be put in the optical path between the active material end closed to the orientation prism and the orientation prism.

Comparing to the prior art, the present invention has the following advantages and effects:

1. The alignment-free solid laser according to the present invention uses an orientation prism as a total reflector. It can also use, for example, a $Cr^{4+}$: YAG element as a Q-switch in the optical path, and uses one active material end with a transitive-reflective film as a output mirror to form a laser cavity. This laser has strong disalignment-resistance. The allowance of the disalignment angle of the orientation prism as a total reflector is up to ±20°, and the deviation of the prism central axis from the cavity axis is allowed up to D/4 (D is the diameter of the active material). It is impossible for the prior lasers to achieve such results. The technology of the present invention has overcome the problem of the laser failure caused by the laser cavity disalignment and therefore the laser can be operated normally after assemblage without alignment;

2. The orientation prism or total reflector of this laser has a feature of parallel reflection in principle. It can overcome the problem of the optical deformation caused by the refractance and gain nonhomogenity in the laser medium, heat-induced deformation, heat-induced birefractance etc. Therefore, the excellent performance of a uniform optical far-field, narrowed divergence angle and concentrated energy is achieved, and the laser beam quality is improved. The damage threshold of the laser crystal and Q-switch device can be reduced and the problem of the laser damage of the solid laser is solved better when the orientation prism or total reflector is used in a continuous or high repeated frequency Q-switched solid laser. Measurable distance, accuracy and angle resolution are increased when the orientation prism of total reflector is used in laser distance-measuring instruments;

3. This laser has a simple structure, reliable performance and is easy to be assembled. It makes various related lasers modified easily, is also of low cost. Furthermore, it is easy to be standardized and modularized to form solid lasers with different specifications, different parameters and for different purposes, therefore, can be extensively used in military, industrial processing, medical and scientific research fields.

Wherein,

1—orientation prism
2—active material
3—focusing cavity
4—part reflector
5—pump lamp
6—pump power
7—cylindrical base
8—mounting nut
9—total reflector
2a—active material
2b—active material
0—corner apex
10—Q-switch.

Embodiments of the Invention

Figure 1:
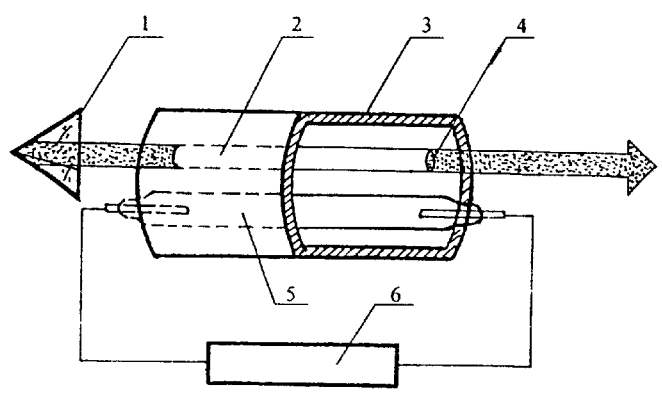
FIG. 1 is a schematic drawing of the alignment-free solid laser structure of the embodiment 1 of the present invention.

The present invention will be described further in conjunction with drawings:

FIG. 1 is a schematic structure drawing of the alignment-free solid laser of the embodiment 1 of the present invention. The active material 2 is a red sapphire crystal. At its one end an orientation prism is located. The corner apex of the orientation prism is located on the axis of the active material 2, the other end of the active material 2 is coated with a transitive-reflective film and is used as the output mirror 4. The pump system consists of the pump lamp 5, the pump power 6 and the ellipsoidal cylindrical focusing cavity 3. An applied voltage from the pump power 6 is applied on the two ends of the pump lamp 5 to light the lamp 5. The active material 2 and the pump lamp 5 are located respectively on the two focused lines of the ellipsoidal cylindrical focusing cavity 3 to ensure that the light beam from the pump lamp 5 is reflected by the inner surfaces of the ellipsoidal cylindrical focusing cavity 3 and is focused on the active material 2. Since the orientation prism 1 is located in front of one end of the active material 2 and its corner apex is located on the axis of the active material 2, the laser beam emitted from the active material 2 can be reflected back to the same along the original path by the orientation prism 1 to oscillate and therefore to achieve laser output. Besides, since one end of the active material 2 is coated with a transitive-reflective film and is used as a partly reflective reflector, the alignment-free performance of the laser can be achieved after assemblage.

Figure 7:
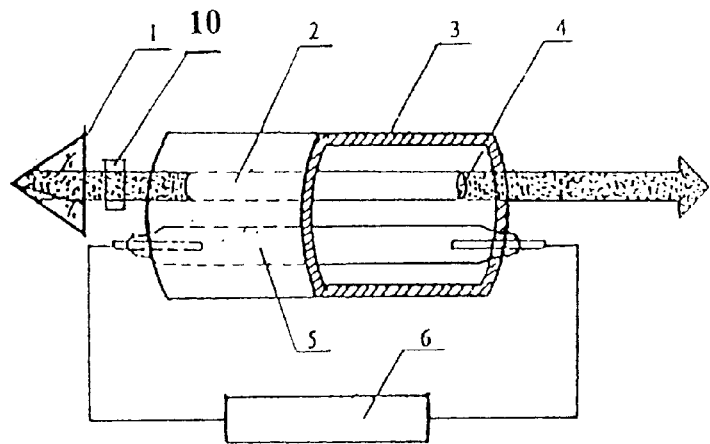
FIG. 7 is a schematic structure drawing of the embodiment 2 of the present invention.

FIG. 7 is a schematic structure drawing of the embodiment 2 of the present invention, wherein, a Q-switch is added in the resonant cavity to improve the laser performance. The active material 2 is $Nd^{3+}$: YAG crystal. A saturable dye element can be used as the Q-switch 10 and the orientation prism 1 is located in front of one end of the active material 2. The corner apex 0 of the orientation prism 1 is located on the axis of the active material 2, the other end of the active material 2 is coated with a transitive-reflective film and is used as the laser output mirror 4. The pump lamp 5, which is connected to the pump power 6, is located in the focusing cavity. The other structures of the embodiment are the same as the embodiment 1 and are unnecessary to be described. The technological indexes are as followings:

| Indexes of the low-frequency laser | |
|---|---|
| Active material | Na³⁺: YAG |
| Wavelength | 1.06 μm |
| Repeat frequency | 10–15 times/min |
| Output energy | ≧16 mj |
| Angle of divergence | ≦5 mrad |
| Q-switch | saturable dye element |
| Disalignment allowance of the resonant cavity mirror | |
| Translation | D/4 (D is the diameter of the active material) |
| Rotation | ±10° |

The embodiment 3 is an alignment-free solid laser, in which Nd: YAG crystal is used. Its structure is basically the same as the embodiment 2 except that the Q-switch is a passitive one. The technological indexes are as followings:

| Indexes of the high frequency laser: | |
|---|---|
| Active material | Nd³⁺: YAG |
| Wavelength | 1.06 μm |
| Peak power | 5 MW |
| Repeat frequency | 5~20 pps |
| Angle of divergence | ≦5 mrad |
| Q-switch | Cr⁴⁺: YAG passitive |
| Cooling mode | liquid |
| Disalignment allowance of the resonant cavity mirror: | |
| Translation | D/4 (D is the diameter of the active material) |
| Rotation | ±10° |

Figure 2:
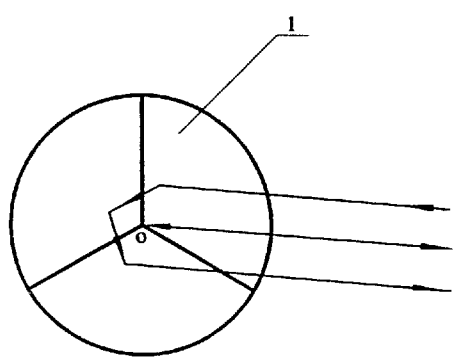
FIG. 2 is a side view of the orientation prism.
Figure 3:
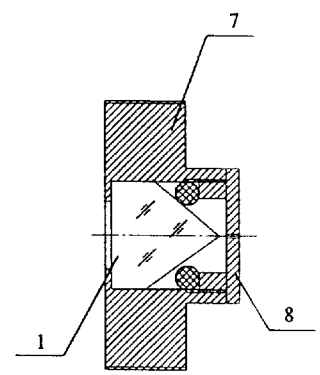
FIG. 3 is a schematic structure drawing of the orientation prism.

FIG. 2 is a side view of the orientation prism. The operation principle is the following. At first, the light beam is incident into the orientation prism 1 from the bottom and is parallel to itself after being reflected by the three surfaces of the orientation prism. The rotation of the orientation prism 1 about the corner apex 0 will not cause any change in the reflected beam direction. Next, the projections of the incident and reflected beams in the light direction is centrally symmetrical about the corner apex 0 and the reflected beam is positively parallel to the incident beam as long as the light beam is reflected successively by the three right angle surfaces, regardless of the angle between the incident beam and the prism bottom. According to FIG. 3, in order to ensure that the corner apex of the orientation prism 1 is located on the axis of the active material 2, the orientation prism 1 must be located on the axis of the cylindrical base 7. Then the orientation prism 1 and the cylindrical base 7 are tightly screwed together as a whole unit with screw nut 8.

Figure 4:
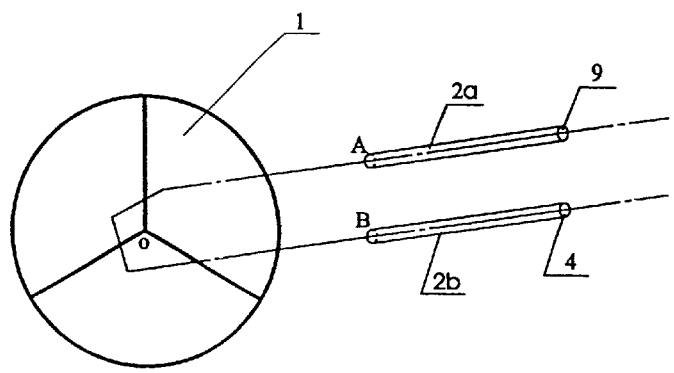
FIG. 4 is a schematic structure drawing of the series alignment-free solid laser.

FIG. 4 is a schematic structure drawing of a double-rod series embodiment, wherein the active material is Nd: glass crystal. According to FIG. 4, the two active material 2a and 2b are symmetrically about the corner apex of the orientation. One end of the active material 2a is coated with a total reflective film and is used as the total reflective mirror 9, while the other end A is coated with a transitive film and is used as the oscillation rod 2. One end of the second active material 2b is coated with a transitive-reflective film and is used as the partly reflective mirror 4, while the other end B with a transitive film is used as a amplifying rod 2b to form a series alignment-free resonant cavity. The laser beam from the oscillation rod 2a, which is reflected into the active material 2a by the reflective mirror 9, is then coupled into the amplifying rod 2b through the orientation prism 1. It is incident onto the reflective mirror 4 to form oscillation and amplification, and finally, a laser beam is emitted from the partly reflective mirror 4 of the amplifying rod 2b.

Figure 5:
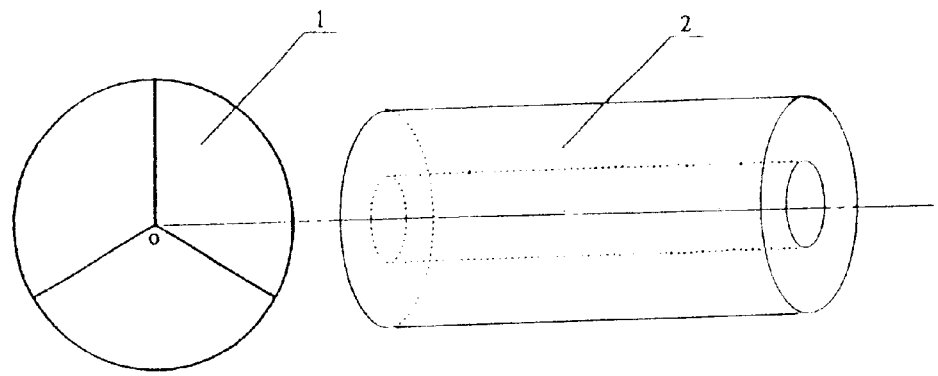
FIG. 5 and FIG. 6 are schematic structure drawings of two additional alignment-free solid lasers.
Figure 6:
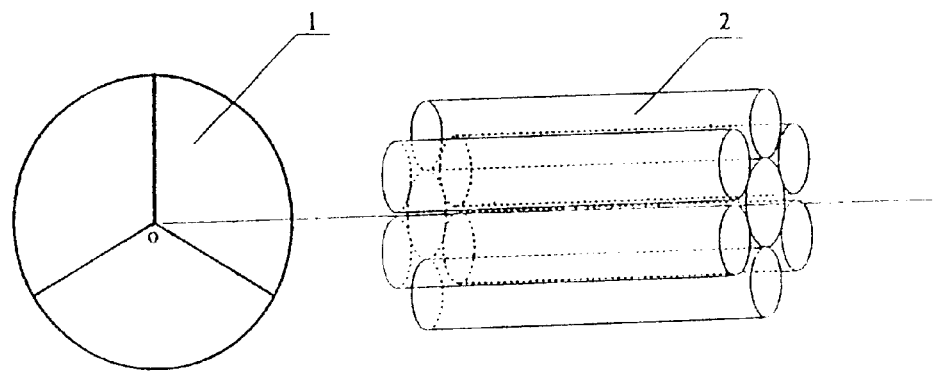

FIGS. 5, 6 are schematic structure drawings of two additional embodiments, wherein, the active material is Nd: YAG. In FIG. 5 the active material is a hollow-cylinder, its end closed to the orientation prism is coated with a transitive film, while the other end is coated with a transitive-reflective film to form a alignment-free resonant cavity with the orientation prism 1 together. This laser has high focusing efficiency and large mode volume, and therefore can meet the requirement for the output of high single-rod power and high beam quality. In FIG. 6, the active material array is symmetrically distributed relatively to the axis passed through the corner apex 0. The one end of the active material array is coated with a transitive film, while the other end is coated with a transitive-reflective film. The two ends and the orientation prism 1 form an alignment-free, array structure cavity that is suitable for the solid laser with multiple beams and high power output.

What is claimed is:

1. An alignment-free solid laser apparatus comprising an active material having an axis, a first end coated with a transitive-reflective film, and a second end, an orientation prism having a bottom surface located close to the second end of the active material, a corner apex opposing the bottom surface and located on the axis of the active material, and three inner surfaces being total reflective surfaces and perpendicular to each other, a pump lamp connected to a pump power, and a focusing cavity reflecting and focusing light from the pump lamp onto the active material, wherein the inner surfaces of the orientation prism form a resonant cavity for light from the active material, and light is emitted through the first end of the active material that serves as an output mirror for the emission.

2. The alignment-free solid laser apparatus according to claim 1 wherein a shape of the orientation prism is equivalent to a corner cut from a cube, and the bottom surface of the orientation prism is equilaterally triangular or circular.

3. The alignment-free solid laser apparatus according to claim 1 wherein the active material is a rod, and the axis of the active material is a longitudinal axis of the rod.

4. The alignment-free solid laser apparatus according to claim 1 wherein the active material consists of a first rod and a second rod symmetrically located relative to the axis of the active material which passes through the corner apex of the orientation prism, and wherein a first end of the first rod is coated with a total reflective film and a second end of the first rod is coated with a transitive film, and a first end of the second rod is coated with a transitive-reflective film and a second end of the second rod is coated with a transitive film.

5. The alignment-free solid laser apparatus according to claim 1 wherein the active material is an array of multiple rods which are symmetrically distributed relatively to the axis of the active material which passes through the corner apex of the orientation prism, and the first ends of the rods next to the orientation prism are coated with transitive film and the second ends of the rods are coated with transitive-reflective film.

6. The alignment-free solid laser apparatus according to claim 1 further comprising a Q-switch between the second end of the active material and the bottom surface of the orientation prism.

7. An alignment-free solid laser apparatus comprising an active material having an axis, a first end coated with a transitive-reflective film, and a second end, an orientation prism having a bottom surface located close to the second end of the active material, a corner apex opposing the bottom surface and located substantially on the axis of the active material, and three inner surfaces being total reflective surfaces and perpendicular to each other, a pump lamp connected to a pump power, and a focusing cavity reflecting and focusing light from the pump lamp onto the active material, wherein the inner surfaces of the orientation prism form a resonant cavity for light from the active material, and light is emitted through the first end of the active material that serves as an output mirror for the emission, and wherein the corner apex of the orientation prism on the axis of the active material renders the solid laser apparatus substantially alignment free.

8. The apparatus according to claim 7, wherein the corner apex of the orientation prism on the axis of the active material allows a misalignment angle of the orientation prism as a total reflector up to ±20° from the axis of the active material.

9. The apparatus according to claim 7, wherein the corner apex of the orientation prism on the axis of the active material allows a deviation of a central axis of the orientation prism from the axis of the active material up to one fourth of a diameter of the active material.

10. The apparatus according to claim 7, wherein a light beam enters into the orientation prism through the bottom surface and is reflected back by the three inner surfaces of the orientation prism such that the reflected light beam is in parallel to the entering beam.

11. The apparatus according to claim 10, wherein a rotation of the orientation prism about the corner apex does not cause a change in the direction of the reflected beam.

12. The apparatus according to claim 10, wherein directions of the entering beam and reflected beam are substantially centrally symmetrical about the corner apex, and the reflected beam is positively parallel to the entering beam as long as the entering beam is reflected successively by the three inner surfaces, regardless of an angle between the entering beam and the prism bottom.

* * * * *